United States Patent [19]

Ivanov et al.

[11] 4,203,372
[45] May 20, 1980

[54] CONTAINER SECURING DEVICE

[76] Inventors: Jury N. Ivanov, Oruzheiny pereulok, 5-9, kv. 60; Konstantin V. Artemov, Nizhegorodskaya ulitsa, 21, kv. 29; Leonid I. Suris, Smolnaya ulitsa, 31, kv. 85; Jury F. Bozhenov, Leningradsky prospekt, 50, kv. 30, all of Moscow, U.S.S.R.

[21] Appl. No.: 860,372

[22] Filed: Dec. 14, 1977

[51] Int. Cl.² ............... B60P 7/08; B61D 45/00; B61J 1/22; B64D 9/00
[52] U.S. Cl. .................. 410/67; 244/137 R; 296/35.3; 410/111
[58] Field of Search ............ 105/366 B, 463, 464, 105/465, 484, 368 B; 296/35 A; 244/137 R

[56] References Cited
U.S. PATENT DOCUMENTS

| | | | |
|---|---|---|---|
| 2,991,734 | 7/1961 | Gabriel | 105/366 R X |
| 3,204,581 | 9/1965 | Davidson | 105/465 |
| 3,759,476 | 9/1973 | Goodwin | 105/464 |
| 3,933,101 | 1/1976 | Blas | 105/366 B |
| 4,023,504 | 5/1977 | Grey | 296/35 A |

Primary Examiner—Joseph F. Peters, Jr.
Assistant Examiner—Howard Beltran
Attorney, Agent, or Firm—Robert E. Burns; Emmanuel J. Lobato; Bruce L. Adams

[57] ABSTRACT

Apparatus for transporting containers in a compartment such as an airplane and releasably fixing the containers in individual storage positions. A carriage movable in opposite directions and track transports the containers sequentially to respective storage position and removes them from the compartment. A plurality of paired tubular stops spaced along the tracks define the storage positions and the containers bear against the stops and are held stationary in respective storage positions. Each stop comprises a tubular rod biased to an extended position above the level of the track to hold the containers stationary between each two successive stops. Each tubular rod has an internal spring biasing it to its extended position. The steps are retracted under control of the carriage and releasably locked under its control in a given direction of travel. The steps assume an extended position when the carriage travels in a direction opposite to the given direction.

3 Claims, 4 Drawing Figures

U.S. Patent May 20, 1980 Sheet 2 of 2 4,203,372
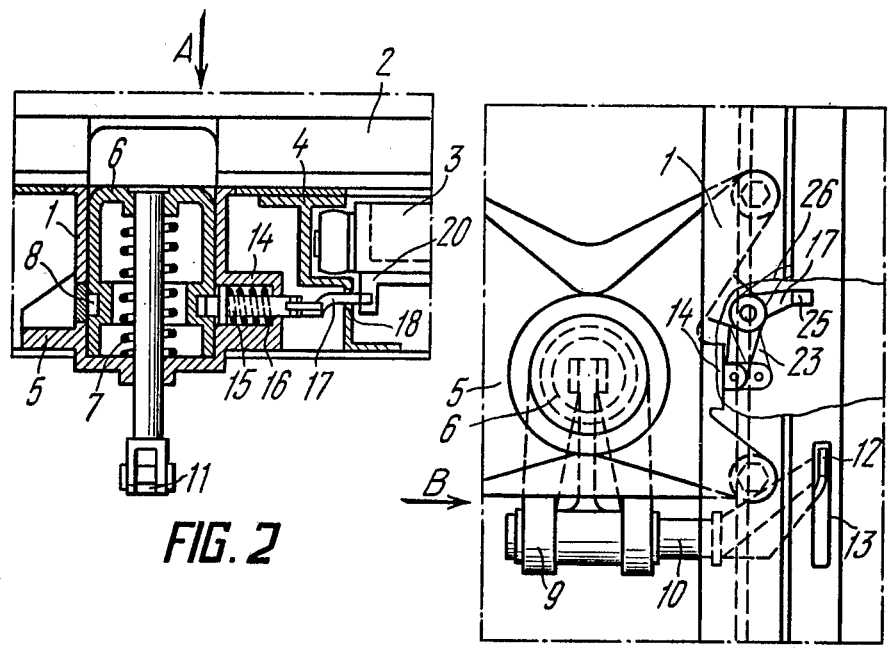
FIG. 2
FIG. 3
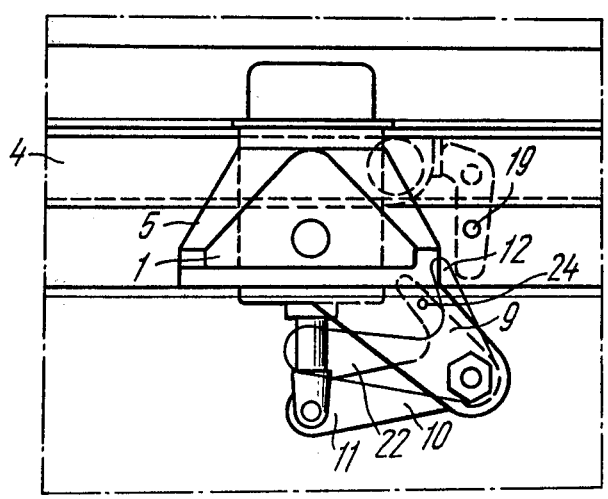
FIG. 4

CONTAINER SECURING DEVICE

BACKGROUND OF THE INVENTION

The present invention relates to air transportation of containerized cargoes and more particularly it relates to the devices for fixing cargo containers in aircraft compartments.

The invention will be utilized most successfully for automatic fixing of cargo containers carried by aircraft.

Known currently are several methods of fixing containers in aircraft compartments, said containers being conveyed to the point of their stowage by a movable element in the form of a carriage.

In one of said methods the containers bear against one another and the end containers are fixed by stops rigidly installed on the end walls of the compartment and contacting the first and the last containers. The containers bear against one another both by their pallets and bodies.

Disadvantages of the above method of fixing containers consist in that the stops mounted on the compartment walls carry the load of the total number of containers held in the compartment since all containers thrust against one. Hence, the end walls of the compartments are subjected to heavy loads and have, therefore, to be made solid and heavy.

Besides, for bearing against the walls, the container bodies must be made excessively stiff which increases the weight of the entire containers. Such a method of fixing containers against one another complicates their handling also because in the case of loading the cargo compartment of the aircraft with an incomplete set of containers, it is necessary to provide some additional devices for fixing the end containers.

Also known in the prior art is a device for fixing cargo containers in aircraft compartments consisting of stops arranged on the compartment floor.

Each stop consists of a body rigidly fixed on the cargo floor and accommodating an articulated turnable stop mounted on a horizontal axle and occupying one of the two positions in service, i.e. the working (vertical) position in which the stop bears against the container pallet and thus fixes the container, and the retracted (horizontal) position; in both positions the stops are locked by spring retainers. Each stop is shifted from one position to the other by hand.

Before loading containers into the cargo compartment and moving them there, all the stops on the way of said containers must be retracted while after placing each container in its place the fixing stops must be shifted to the working position.

A disadvantage of this device consists in the use of manual labour for handling the containers and in the necessity for moving each stop by hand from the retracted to the working position and back which increases considerably the container loading and unloading time.

SUMMARY OF THE INVENTION

The main object of the present invention is to provide a device for automatic fixing of cargo containers in aircraft compartments.

Another object of the invention is to provide a device for individual fixing of each container in the cargo compartment of an aircraft.

Still another object of the invention resides in raising the reliability of the fixing device.

A further object of the invention resides in curtailing the time for loading the containers into and unloading them from the aircraft.

And, finally, one more object of the invention resides in ensuring a possibility of carrying by air any number of containers from one to a maximum number permissible for a given type of aircraft.

These and other objects are accomplished by providing a device for fixing cargo containers moved by a carriage to the point of their stowage comprising stops fastened on the compartment floor and individually fixing each container wherein, according to the invention, each stop consists of a cylindrical body accommodating a coaxial spring-loaded rod with a circular recess in the middle, said rod being articulated to one of the ends of a turnable rocker installed on the body, the other end of said rocker being located on the path of a carriage which contacts said other end and inserts the rod into the body, and there is a spring-loaded locking element installed in a boss of the body for entering into the circular recess and for fixing the rod in the body, said element being articulated to a two-arm turnable lever installed on the body of the device, the other arm of said lever being located on the path of the carriage which contacts said arm for withdrawing the locking element from the recess when the rod is extended from the body.

This design of the elements of the device allows each container to be fixed individually and automatically in the cargo compartment of an aircraft.

BRIEF DESCRIPTION OF THE DRAWINGS

Now the invention will be described in detail by way of example with reference to the accompanying drawings, in which:

FIG. 2 is a section view taken along section line II—II in FIG. 1;

FIG. 3 is a view along arrow A in FIG. 2;

FIG. 4 is a view along arrow B in FIG. 3.

DESCRIPTION OF THE PREFERRED EMBODIMENTS

Figure 1:
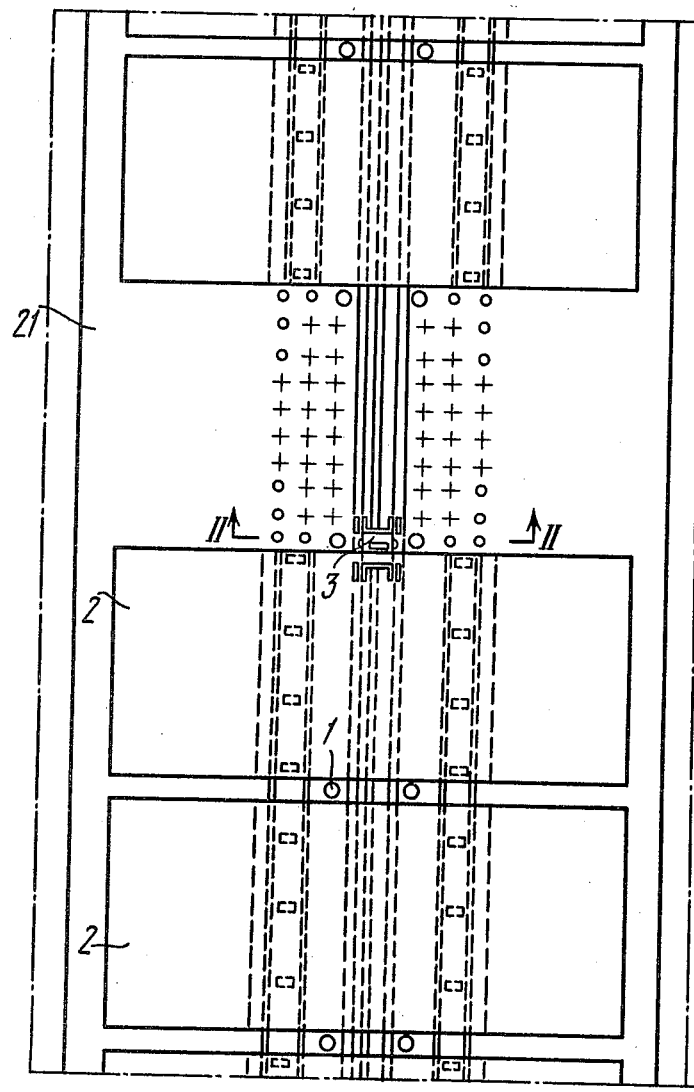
FIG. 1 is a plan view of an aircraft cargo compartment with containers, carriage and stops of the device.

The device for fixing cargo containers in the compartments of an aircraft (FIGS. 1,2, 3, 4) comprises a number of stops 1, to suit the type of the aircraft, secured on the aircraft compartment floor between containers 2.

The containers 2 are moved along the compartment by a carriage 3 sliding over guide rails 4. Each stop 1 comprises a cylindrical body 5 accommodating a coaxial rod 6 with a return spring 7.

The middle portion of the rod 6 is provided with a circumferential circular recess 8.

A boss 9 of the body mounts a turnable rocker 10 installed on an axle. One end 11 of the rocker 10 is articulated to the rod 6 while its free end 12 thereof extends through a slot 13 in the rails 4 and is located on the path of the carriage 3. Besides, the body 5 is provided with a side boss 14 accommodating a locking element 15 with a spring 16. The locking element 15 can enter the circular recess 8 through a side hole in the body 5 and is articulated to a two-arm turnable lever 17 mounted on an axle in the body 5. The other arm of the lever 17 is brought out through a slot 18 in the rails 4 and is located on the path of the carriage 3. When the carriage 3 moves, the rocker 10 and the two-arm lever 17 are turned, respectively, by levers 19 and 20 mounted on axles on the carriage 3, both the rocker 10 and the two-arm lever 17 being turned only when the carriage 3 moves in a certain one direction. When the carriage 3 moves in the opposite direction, the levers 19 and 20 encountering the rocker 10 and the two-arm lever 17 turn on their axles without turning the rocker 10 and the two-arm lever 17.

The containers 2 are loaded and unloaded through a loading hatch 21. The containers 2 loaded into the aircraft compartment are fixed therein by stops 1 in which case the rod 6 occupies the uppermost position extended from the body 5, the rocker 10 and the two-arm lever 17 occupy, respectively, positions 22 and 23 and the locking element 15 is completely retracted into the boss 14, thereby compressing the spring 16.

For inserting the stops 1 into the compartment floor it is necessary to press the end 12 of the rocker 10 and shift it to the position shown in broken lines at 24. This causes the rod 6 to enter the body 5 and compress the return spring 7. When the rod 6 is completely inserted into the body 5, the end of the locking element 15 is moved by the spring 16 into the circular recess 8, moving the two-arm lever 17 to the position 25 and locking the rod 6 in the lower retracted position.

When the containers 2 are being unloaded from the compartment, the device functions as follows. Before the beginning of the unloading operation all the stops 1 must be extended so that the rods 6 occupy the upper position while for unloading the containers 2, and conveying them with the carriage 3 to the hatch 21 the rods 6 must be retracted into the body 5. Then the motor of the carriage 3 is turned on and the carriage is moved to collect the container 2. The lever 20 passing by the two-arm lever 17 does not contact the latter since said lever 17 is turned to the position 26. The lever 19 of the carriage 3 comes in contact with the end 12 of the rocker 10, turns it to the position 24 at the same time retracting the rod 6 into the body 5 where it is fixed automatically by the locking element 15. As soon as the container 2 is grabbed by the carriage 3, the direction of its movement is reversed and the container 2 is conveyed to the hatch 21. The lever 19 passing by the rocker 10 in the position 24 does not contact the latter while the lever 20 turns on the carriage 3 without turning the two-arm lever 17 so that the rod 6 stays retracted into the body 5. When the carriage 3 moves to pick up the next container 2, the elements of the device function in a similar way as described above.

When the containers 2 are being loaded into the compartment, the device operates as follows. Before the beginning of loading all the stops 1 must be retracted into the bodies 5 so as not to interfere with the conveyance of the containers 2 along the compartment. The carriage 3 conveys the containers 2 to their points of stowage in the aircraft cargo compartment.

Encountering the two-arm lever 17, the lever 20 presses the latter and withdraws the locking element 15 from the circular recess 8 which allows the return spring 7 to shift the rod 6 to the upper position. Meanwhile the rocker 10 turns to the position 22. The container 2 is put in place and fixed by the stop 1. The carriage 3 is brought to the hatch 21 for picking the next container and the lever 20 passing the two-arm lever 17 in position 26 does not contact it while the lever 19 turns on the carriage 3 without turning the rocker 10. All the following containers are loaded into the aircraft compartment in a similar manner.

As distinct from the other known devices the device for fixing containers according to the present invention permits reliable automatic fixing of containers in aircraft compartments due to the introduction of a spring-loaded rod with a circular recess, a locking element, as well as a two-arm rocker and a turnable lever actuated by the movement of the conveying carriage.

We claim:

1. Apparatus for transporting containers in a storage compartment and releasably fixing the containers in individual storage positions comprising,
   a track along which containers are transported individually and on which the containers are removably stored, a carriage movable in opposite directions along a path defined by said track for transporting the containers sequentially to a respective storage position and for removal from the storage position for removal thereof from said compartment, a plurality of paired tubular stops spaced along said track defining the storage positions of the individual containers and against which individual containers bear, said paired stops holding individual containers stationary in the storage position thereof, each said stop comprising a tubular rod biased to an extended position extending above the level of said track to hold the containers stationary between each two successive stops, each tubular rod having an internal spring biasing it to said extended position, lock means on each said stop actuated by said carriage when travelling in said one direction for retracting the individual stop to said retracted position, lock means automatically releasably locking the stops individually when actuated to said retracted position, means for releasing each said lock means under control of said carriage to allow the corresponding stop to assume its extended position when said carriage travels in an opposite direction.

2. Apparatus for transporting containers in a storage compartment and releasably fixing the containers in individual storage positions according to claim 1, in which said track comprises recesses in which the stop are housed individually, and in which each lock means is disposed adjacent a corresponding recess.

3. Apparatus for transporting containers in a storage compartment and releasably fixing the containers in individual storage positions according to claim 2, in which said each stop said comprises a circumferential recess, and in which each said lock means comprises a pin constantly biased in a direction to an extended position for insertion into said recess retractable to a retracted position under control of said carriage.

* * * * *